US008889575B2

(12) United States Patent
Boek et al.

(10) Patent No.: US 8,889,575 B2
(45) Date of Patent: Nov. 18, 2014

(54) ION EXCHANGEABLE ALKALI ALUMINOSILICATE GLASS ARTICLES

(75) Inventors: Heather Debra Boek, Corning, NY (US); Mark Owen Weller, Painted Post, NY (US); Randall Eugene Youngman, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 628 days.

(21) Appl. No.: 13/118,859

(22) Filed: May 31, 2011

(65) Prior Publication Data

US 2012/0308827 A1  Dec. 6, 2012

(51) Int. Cl.
*C03C 3/076* (2006.01)
*C03C 3/112* (2006.01)
*C03C 3/115* (2006.01)
*C03C 3/118* (2006.01)
*C03C 3/097* (2006.01)
*C03C 3/089* (2006.01)
*C03C 3/091* (2006.01)
*C03C 3/083* (2006.01)
*C03C 21/00* (2006.01)
*C03C 3/064* (2006.01)

(52) U.S. Cl.
CPC .......... *C03C 3/097* (2013.01); *C03C 3/115* (2013.01); *C03C 21/001* (2013.01); *C03C 3/091* (2013.01); *C03C 21/002* (2013.01); *C03C 3/112* (2013.01); *C03C 3/064* (2013.01); *C03C 21/00* (2013.01); *C03C 3/118* (2013.01); *C03C 3/089* (2013.01); *C03C 3/083* (2013.01); *C03C 3/076* (2013.01)
USPC ............ 501/55; 501/63; 501/65; 501/66; 501/68; 501/57; 501/58; 501/59; 428/410; 428/426

(58) Field of Classification Search
CPC ........ C03C 3/062; C03C 3/064; C03C 3/083; C03C 3/091; C03C 3/097; C03C 3/112; C03C 3/115; C03C 3/118; C03C 21/00; C03C 21/001; C03C 21/002
USPC ........... 501/57, 58, 59, 63, 66, 68, 73, 77, 55, 501/65; 428/410, 426
See application file for complete search history.

(56) References Cited

U.S. PATENT DOCUMENTS

| | | | | |
|---|---|---|---|---|
| 3,357,876 | A |  | 12/1967 | Rinehart ........................ 161/1 |
| 3,433,611 | A | * | 3/1969 | Kubichan et al. .......... 65/30.14 |
| 3,907,577 | A | * | 9/1975 | Kiefer et al. ...................... 501/4 |
| 4,053,679 | A |  | 10/1977 | Rinehart |
| 4,055,703 | A |  | 10/1977 | Rinehart |
| 5,674,790 | A | * | 10/1997 | Araujo ............................ 501/66 |
| 5,895,768 | A |  | 4/1999 | Speit |
| 6,511,932 | B2 | * | 1/2003 | Yamaguchi et al. ............ 501/63 |
| 6,518,211 | B1 |  | 2/2003 | Bradshaw et al. |
| 6,867,157 | B2 | * | 3/2005 | Ishioka et al. .................. 501/59 |
| 7,285,509 | B2 |  | 10/2007 | Bayya et al. |
| 7,482,296 | B2 | * | 1/2009 | Messerschmidt et al. ...... 501/77 |
| 8,586,492 | B2 | * | 11/2013 | Barefoot et al. ................ 501/66 |
| 2006/0205584 | A1 | * | 9/2006 | Ikenishi et al. ................. 501/66 |
| 2009/0197088 | A1 |  | 8/2009 | Murata ......................... 428/410 |
| 2009/0215607 | A1 |  | 8/2009 | Dejneka et al. |
| 2009/0220761 | A1 |  | 9/2009 | Dejneka et al. .............. 428/220 |
| 2009/0263662 | A1 |  | 10/2009 | Shelestak et al. |
| 2010/0288351 | A1 | * | 11/2010 | Speit et al. ..................... 136/256 |
| 2010/0291353 | A1 |  | 11/2010 | Dejneka et al. .............. 428/192 |
| 2010/0300535 | A1 | * | 12/2010 | Aitken et al. ................. 136/260 |
| 2011/0014475 | A1 |  | 1/2011 | Murata ......................... 428/410 |
| 2011/0294648 | A1 | * | 12/2011 | Chapman et al. ............... 501/63 |
| 2011/0294649 | A1 | * | 12/2011 | Gomez et al. ................... 501/66 |
| 2012/0052271 | A1 |  | 3/2012 | Gomez et al. ................ 428/213 |

FOREIGN PATENT DOCUMENTS

| | | |
|---|---|---|
| EP | 1695946 | 8/2006 |
| JP | 2004-168578 | 6/2004 |
| SU | 525630 | 8/1976 |
| WO | 02/090279 | 11/2002 |
| WO | WO 2011144024 A1 * | 11/2011 |
| WO | 2011/149811 | 12/2011 |
| WO | 2012/008236 | 1/2012 |
| WO | 2012/099053 | 7/2012 |
| WO | 2012/126394 | 9/2012 |

OTHER PUBLICATIONS

L. Calvez, M. Roze, H.L. Ma, J.C. Sangleboeuf, Jean-Pierre Guin, X.H. Zhang, "Strengthening of chalco-halide glasses by ion exchange", Journal of Non-oxide and Photonic Glasses, vol. 1, No. 1, 2009, pp. 30-37.

(Continued)

*Primary Examiner* — Karl Group
*Assistant Examiner* — Elizabeth A Bolden
(74) *Attorney, Agent, or Firm* — Robert P. Santandrea

(57) ABSTRACT

Ion exchangeable glass articles are disclosed. In one embodiment, a glass article formed from alkali aluminosilicate glass which may include $Ga_2O_3$, $Al_2O_3$, $Na_2O$, $SiO_2$, $B_2O_3$, $P_2O_5$ and various combinations thereof. The glass article may generally include about X mol % of $Ga_2O_3$ and about Z mol % of $Al_2O_3$, wherein $0 \leq X \leq 20$, $0 \leq Z \leq 25$ and $10 \leq (X+Z) \leq 25$. The glass article may also include from about 5 mol % to about 35 mol % $Na_2O$, $SiO_2$ may be present in an amount from about 40 mol % to about 70 mol % $SiO_2$. The glass article may further include Y mol % $B_2O_3$ where Y is from 0 to about 10. The glass article may further include (10-Y) mol % of $P_2O_5$. Glass articles formed according to the present invention may be ion-exchange strengthened. In addition, the glass articles may have a low liquid CTE which enables the glass articles to be readily formed into complex shapes.

26 Claims, 6 Drawing Sheets

(56) References Cited

OTHER PUBLICATIONS

V.V. Moiseev, "Ion exchange and constitution of glass", Journal of Non-Crystalline Solids, vol. 42, Issues 1-3, Oct. 1980, pp. 589-600.
Alaev et al; "Interdiffusion of Cations and the Change in the Refractive Index in Gallosilicate and Gallogermanate Glasses"; Soviet Journal of Glass Physics and Chemistry; 15 Mar./Apr. 1989, No. 2 pp. 128-133.
Peng et al; "High Resolution $^{17}$O MAS and Triple-Quantum MAS NMR Studies of Gallosilicate Glasses"; Journal of Non-Crystalline Solids 354 (2008) pp. 3120-3128.
International Searching Authority; International Search Report; Mailing Date: Feb. 28, 2013; pp. 1-6.

* cited by examiner

ION EXCHANGEABLE ALKALI ALUMINOSILICATE GLASS ARTICLES

BACKGROUND

1. Field

The present specification generally relates to glass articles and, more specifically, to ion exchangeable glass articles.

2. Technical Background

Glass articles are commonly utilized in a variety of consumer and commercial applications such as electronic applications, automotive applications, and even architectural applications. For example, consumer electronic devices, such as mobile phones, computer monitors, GPS devices, televisions and the like, commonly incorporate glass substrates as part of a display. In some of these devices, the glass substrate is also utilized to enable touch functionality, such as when the displays are touch screens. Many of these devices are portable and, as such, the glass articles incorporated in the devices need to be sufficiently robust to withstand impact and/or damage, such as scratches and the like, during both use and transport.

As both the aesthetic design and functionality of electronic devices continue to develop, glass articles with increasingly complex shapes are being incorporated into such devices. Such complex shapes may include curves and contours, such as when the glass articles are non-planar. However, current glass compositions used to make such glass articles often have high softening temperatures and high liquid coefficients of thermal expansion which makes forming the glass compositions into complex shapes difficult.

Moreover, such glass substrates need to be compatible with large-scale sheet glass manufacturing methods, such as down-draw processes and slot-draw processes which are commonly used today to manufacture thin glass substrates for incorporation into electronic devices.

SUMMARY

According to one embodiment, a glass article formed from alkali aluminosilicate glass includes $Ga_2O_3$, $Al_2O_3$, $Na_2O$, $SiO_2$, $B_2O_3$, $P_2O_5$ and various combinations thereof. The glass article may include about X mol % of $Ga_2O_3$, wherein $0 \leq X \leq 20$. The glass article may also include about Z mol % of $Al_2O_3$, wherein $0 \leq Z \leq 25$. The sum of X and Z may be such that $10 \leq (X+Z) \leq 25$. The glass article may additionally include from about 5 mol % to about 35 mol % $Na_2O$ and from about 40 mol % to about 70 mol % $SiO_2$. The glass article may further include Y mol % of $B_2O_3$ and (10-Y) mol % of $P_2O_5$ where Y is from 0 to about 10.

In another embodiment, a glass article formed from alkali aluminosilicate glass includes $Ga_2O_3$, $Al_2O_3$, $Na_2O$, $SiO_2$, $B_2O_3$, and various combinations thereof, without containing $P_2O_5$. The glass article may include about X mol % of $Ga_2O_3$, wherein $0 \leq X \leq 20$. The glass article may also include about Z mol % of $Al_2O_3$, wherein $0 \leq Z \leq 25$. The sum of X and Z may be such that $10 \leq (X+Z) \leq 25$. The glass article may additionally include from about 5 mol % to about 35 mol % $Na_2O$ and from about 40 mol % to about 70 mol % $SiO_2$. The glass article may further include from about 1 mol % to about 10 mol % of $B_2O_3$. The alkali aluminosilicate glass may have a softening point $\leq 875°$ C.

In another embodiment, a glass article formed from alkali aluminosilicate glass includes $Ga_2O_3$, $Al_2O_3$, $Na_2O$, $SiO_2$, $P_2O_5$, and various combinations thereof, without containing $B_2O_3$. The glass article may include about X mol % of $Ga_2O_3$, wherein $0 \leq X \leq 20$. The glass article may also include about Z mol % of $Al_2O_3$, wherein $0 \leq Z \leq 25$. The sum of X and Z may be such that $10 \leq (X+Z) \leq 25$. The glass article may additionally include from about 5 mol % to about 35 mol % $Na_2O$ and from about 40 mol % to about 70 mol % $SiO_2$. The glass article may further include from about 1 mol % to about 10 mol % of $P_2O_5$. The alkali aluminosilicate glass may have a softening point $\leq 975°$ C.

In yet another embodiment, a glass article formed from alkali aluminosilicate glass includes from about 10 mol % to about 20 mol % $Al_2O_3$; from about 40 mol % to about 70 mol % $SiO_2$; and from about 10 mol % to about 20 mol % $Na_2O$. The alkali aluminosilicate glass may further comprise about Y mol % $B_2O_3$ and (5-Y) mol % $P_2O_5$ where Y is from 0 to about 5. The glass may also include from about 1 mol % to about 6 mol % fluorine.

Additional features and advantages of the glass articles and glass compositions will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
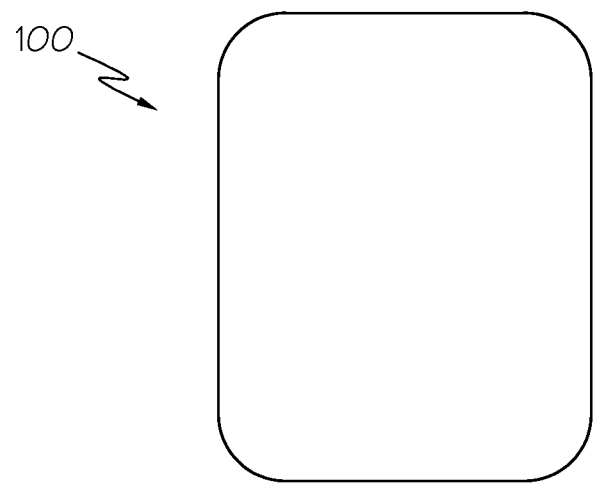
FIG. 1 schematically depicts a glass article formed from an alkali aluminosilicate glass according to one or more embodiments shown and described herein.

Reference will now be made in detail to embodiments of alkali aluminosilicate glasses which may be used in the formation of glass articles. One embodiment of a glass article formed from alkali aluminosilicate glass is generally depicted in FIG. 1. The alkali aluminosilicate glass generally comprises $Ga_2O_3$, $Al_2O_3$, $Na_2O$, $SiO_2$, $B_2O_3$, $P_2O_5$, or various combinations thereof. In some embodiments described herein, the alkali aluminosilicate glass is ion exchangeable and has a relatively low liquid coefficient of thermal expansion (liquid CTE) such that the alkali aluminosilicate glass is readily formable into complex shapes. The alkali aluminosilicate glass and glass articles formed from alkali aluminosilicate glass will be described in more detail herein.

The following terms will be used to describe the alkali aluminosilicate glasses:

The term "softening point," as used herein, refers to the temperature at which the viscosity of the glass is $1 \times 10^{7.6}$ poise.

The term "annealing point," as used herein, refers to the temperature at which the viscosity of the glass is $1 \times 10^{13}$ poise.

The term "melting point," as used herein, refers to the temperature at which the viscosity of the glass is 200 poise.

The term "strain point," as used herein, refers to the temperature at which the viscosity of the glass is $3 \times 10^{14}$ poise.

The aforementioned values for the softening point, annealing point, melting point, and strain point are for glass having a density of about 2.5 $gm/cm^3$ and surface tension of 300 dynes/cm.

Unless otherwise specified herein, a range of values includes both the upper and lower limits of the range. For example, a range of 1-10 mol % includes the values of 1 mol % and 10 mol %.

Referring to FIG. 1, a glass article 100 formed from the alkali aluminosilicate glass compositions described herein is schematically depicted. The glass article 100 may be used as a cover glass for portable electronic devices such as digital music players, smart phones or the like. Alternatively, the glass article 100 may be used in display devices such as LCD televisions, LCD computer monitors and similar display devices. Such glass articles may also be utilized in automotive and even architectural applications. The alkali aluminosilicate glass compositions from which the glass article 100 is formed may be ion-exchange strengthened and have a sufficiently low softening point and a sufficiently low coefficient of thermal expansion to enable shaping the glass article formed from the alkali aluminosilicate glass compositions into complex shapes.

In particular, the alkali aluminosilicate glasses described herein may be ion-exchange strengthened to achieve a depth of layer of about 10 μm or more and a compressive stress of at least 500 MPa.

The alkali aluminosilicate glass compositions described herein generally include a combination of $Ga_2O_3$, $Al_2O_3$, $Na_2O$, $SiO_2$, $B_2O_3$, and $P_2O_5$, which enable the formation of ion exchangeable glasses with sufficiently low softening points and sufficiently low coefficients of thermal expansion that the glasses are readily formable into complex shapes. In other embodiments, the alkali aluminosilicate glasses include a combination of $Ga_2O_3$, $Al_2O_3$, $Na_2O$, $SiO_2$, and $P_2O_5$, or a combination of $Ga_2O_3$, $Al_2O_3$, $Na_2O$, $SiO_2$, and $B_2O_3$. In still other embodiments, the alkali aluminosilicate glasses include a combination of $Al_2O_3$, $Na_2O$, $SiO_2$, $B_2O_3$, $P_2O_5$, and fluorine.

Figure 2:
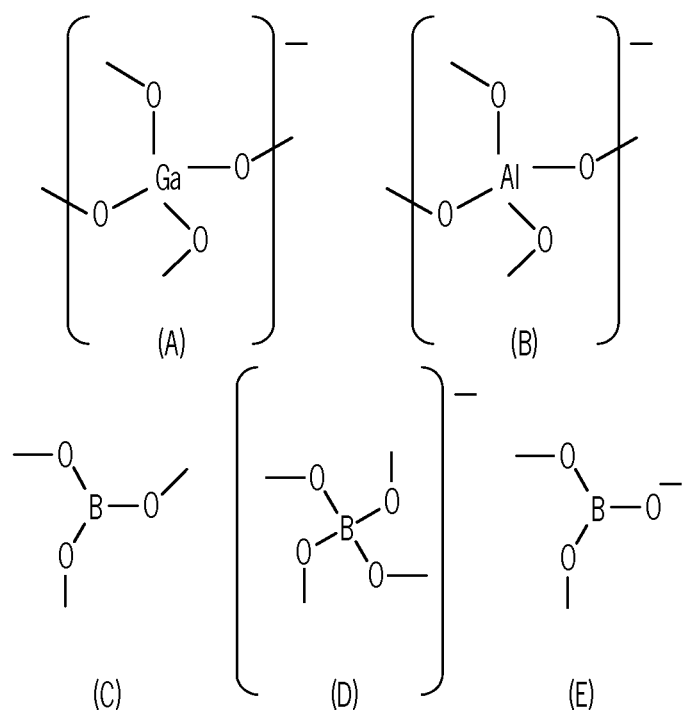
FIG. 2 schematically depicts some of the network elements present in the alkali aluminosilicate glass compositions as a result of the addition of $Ga_2O_3$, $B_2O_3$, and $Al_2O_3$.
Figure 3:
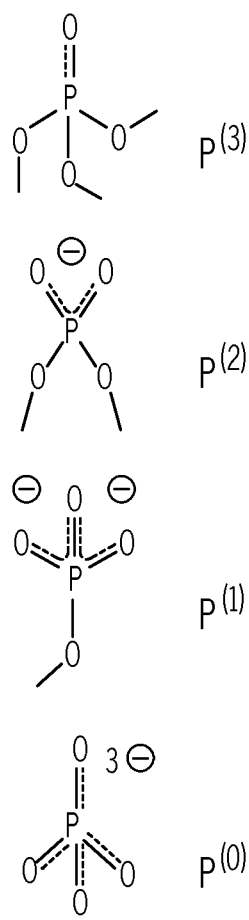
FIG. 3 schematically depicts some of the network elements present in the alkali aluminosilicate glass compositions as a result of the addition of $P_2O_5$.

In the embodiments of the alkali aluminosilicate glass compositions described herein, additions of $Ga_2O_3$, $B_2O_3$, $P_2O_5$, $Al_2O_3$, and fluorine are utilized to form charged species in the glass network which interact with $Na^+$ and modify the properties of the resultant glass. FIGS. 2 and 3 schematically depict some of the network elements present in these glass compositions as a result of the addition of $Ga_2O_3$, $B_2O_3$, $P_2O_5$, and $Al_2O_3$.

Specifically, referring to FIG. 2, structure (A) schematically depicts a $GaO_4^-$ tetrahedron, structure (B) schematically depicts an $AlO_4^-$ tetrahedron, structure (C) schematically depicts trigonal $BO_3$, structure (D) schematically depicts tetrahedral $BO_4^-$ and structure (E) schematically depicts asymmetric trigonal $BO_3^-$. Structures (A), (B) and (D) all have negative charge which is delocalized over the tetrahedron. Structure (C) is neutral and does not contribute to the charge balancing role of $Na^+$. Structure (E) has one non-bridging oxygen on boron, similar to non-bridging oxygen on silicon in certain silicates.

The interaction between $Na^+$ and these species differs based on charge localization (i.e., negative charge spread over a tetrahedral element or highly localized charge at a non-bridging oxygen) as well as the extent of ionic interaction between the two charged species, which is partially controlled by the electronegativity of the central cation. For example, the metal center in structures (A), (B) and (D) are all different and thus the interaction between these singly charged tetrahedra and $Na^+$ will be slightly different. By altering the glass composition with these species to form favorable environments for the interaction with $Na^+$, the ion-exchange performance of the glass composition can be improved.

Referring to FIG. 3, in a similar manner, the introduction of $P_2O_5$ creates additional charge-balancing roles for $Na^+$. Specifically, some of the phosphate groups are highly charged and require more than one $Na^+$ ion for proper charge balancing in the glass network. In the alkali aluminosilicate glass compositions described herein which contain $P_2O_5$, the addition of phosphorous creates highly charged phosphorous groups, such as the $P^{(0)}$ and $P^{(1)}$ groups of FIG. 3. The high depolymerization of these groups provides triply- and doubly-charged polyhedra in the glass network, both of which serve as sites of high charge density for the interaction with $Na^+$. These highly charged species (relative to $AlO_4^-$, $BO_4^-$, or even non-bridging oxygen on Si) interact differently with $Na^+$ and result in improved ion-exchange dynamics.

Moreover, additions of fluorine in some embodiments of the alkali aluminosilicate glass compositions described herein create Al—F environments in the glass network with terminal fluorine groups. These environments create a mechanism for network depolymerization and also provide more sites for interaction with alkali (i.e., $Na^+$) and other modifying cations. Additions of fluorine may also create Al—F environments which require charge-balancing with $Na^+$ (or the exchanged cation), which modifies the kinetics of the ion-exchange process.

In the embodiments of the alkali aluminosilicate glass compositions described herein, $SiO_2$ is the largest constituent of the alkali aluminosilicate glass composition and, as such, forms the matrix of the glass. $SiO_2$ generally serves as a viscosity enhancer that aids in the formability of the glass and imparts chemical durability to the glass. $SiO_2$ is generally present in the glass compositions described herein in a concentration ranging from about 40 mol % up to about 70 mol %. When the concentration of $SiO_2$ exceeds about 70 mol %, the melting temperature of the glass becomes prohibitively high. In some embodiments, $SiO_2$ may be present in a concentration ranging from about 50 mol % up to about 65 mol %, or even about 50 mol % up to about 55 mol %.

The alkali aluminosilicate glass compositions described herein may further include $Al_2O_3$. $Al_2O_3$ may have a concentration of Z mol % where Z is from about 0 to about 25. In some embodiments, $Al_2O_3$ may be present in the glass in a concentration from about 5 mol % up to about 15 mol % (i.e., Z is from about 5 to 15). In still other embodiments the concentration of $Al_2O_3$ in the alkali aluminosilicate glass composition may be from about 10 mol % to about 20 mol % (i.e., Z is from about 10 to about 20).

Some of the alkali aluminosilicate glass compositions described herein may further include $Ga_2O_3$. It has been determined that the substitution of $Ga_2O_3$ for all or a portion of the $Al_2O_3$ in the alkali aluminosilicate glass composition decreases the softening point of the glass by about 5.5° C. to about 12° C. per 1 mol % of $Ga_2O_3$, thereby improving the formability of the glass by decreasing the viscosity of the glass. In the embodiments of the alkali aluminosilicate glass compositions described herein, the softening point of the glass is generally less than or equal to 865° C. and greater than about 450° C. $Ga_2O_3$ may be present in the alkali aluminosilicate glass compositions at a concentration of X mol % where X is from about 0 to about 20 or even from about 1 to about 20. In some embodiments, X may be from about 0 to about 15 or even from about 1 to about 15. In some other embodiments, X may be from about 1 to about 12 or even from about 2 to about 10.

As noted above, $Ga_2O_3$ may be added in substitution for $Al_2O_3$. Accordingly, in some of the alkali aluminosilicate glass compositions, the concentration of $Al_2O_3$ and the concentration of $Ga_2O_3$ may be such that X+Z is from about 10 to about 25. In other embodiments, the concentration of $Al_2O_3$ and the concentration of $Ga_2O_3$ may be such that X+Z is from about 17 to about 24 to facilitate the desired decrease in the softening point of the glass and thereby improve the formability of the glass.

While certain embodiments of the alkali aluminosilicate glass compositions are described herein as comprising $Ga_2O_3$, it should be understood that other embodiments of alkali aluminosilicate glass compositions may be formed without the addition of $Ga_2O_3$, such as when other constituent materials are utilized to lower the softening point of the glasses.

Fluxes are added to the alkali aluminosilicate glass composition to obtain glass melting temperatures that are suitable for a continuous manufacturing process, such as, for example, a fusion down-draw glass formation process or a slot-draw glass formation process. The alkali aluminosilicate glass compositions described herein include $Na_2O$, which serves as a flux. Specifically, additions of $Na_2O$ are used to decrease the melting temperature of the glass composition and decrease the liquidus temperature of the glass composition, both of which improve the ease of manufacturing the glass. Additions of $Na_2O$ also enable ion exchange of the alkali aluminosilicate glass compositions and thereby facilitate strengthening the glass by ion exchange following formation.

In the embodiments of the alkali aluminosilicate glass compositions described herein, $Na_2O$ may be present in the glass compositions in a concentration from about 5 mol % to about 35 mol %. In some embodiments, the concentration of $Na_2O$ may be from about 15 mol % to about 25 mol %. In general, the total concentration of $Na_2O$ is less than or equal to the sum of the concentrations of $Al_2O_3$, $Ga_2O_3$ and $SiO_2$ (i.e., mol % $Na_2O \le$ mol % $(Al_2O_3+Ga_2O_3+SiO_2)$). In some embodiments, mol % $Na_2O$/(mol % $Al_2O_3$+mol % $Ga_2O_3$)$\approx 1$.

In some embodiments described herein, the alkali aluminosilicate glasses may also include $B_2O_3$ as a constituent component. Like $Ga_2O_3$, $B_2O_3$ may be added to the glasses to lower the softening point of the glass. In some embodiments, $B_2O_3$ is present in the alkali aluminosilicate glass composition in a concentration of Y mol %, where Y is from about 0 to about 10. In some other embodiments, Y may be from about 0 to about 5. In other embodiments, Y may be from about 1 to about 10 or even from about 1 to about 5.

The alkali aluminosilicate glass compositions described herein may also include $P_2O_5$. $P_2O_5$ is added to the glass composition to improve the ion-exchange performance of the glass. Specifically, it has been found that, for a given salt bath temperature in an ion-exchange process, the addition of $P_2O_5$ to a glass composition significantly shortens the time required to obtain a target compressive stress value without a significant reduction in the corresponding depth of layer. Alternatively, for a given salt bath temperature, the addition of $P_2O_5$ to the glass composition significantly increases the depth of layer achieved relative to a glass composition without $P_2O_5$ for the same processing time.

In some embodiments described herein, $P_2O_5$ may be added to the alkali aluminosilicate glass compositions in substitution for a portion of the $B_2O_3$, or all of the $B_2O_3$. For example, in embodiments where the concentration of $B_2O_3$ in the glass is Y mol % and Y is from about 0 to about 10, $P_2O_5$ may be present in the glass composition in a concentration of (10-Y) mol %. Alternatively, in embodiments where the concentration of $B_2O_3$ in the glass composition is Y mol % and Y is from about 0 to about 5, $P_2O_5$ may be present in the glass in a concentration of (5-Y) mol %. Accordingly, in embodiments where $P_2O_5$ is substituted for all or a portion of the $B_2O_3$ in the alkali aluminosilicate glass composition, the concentration of the $P_2O_5$ may be from about 0 mol % to about 10 mol % or even from about 0 mol % to about 5 mol %.

In some other embodiments, $P_2O_5$ may be included in alkali aluminosilicate glass compositions where no $B_2O_3$ is present (i.e., the concentration of $B_2O_3$ is 0 mol %). In such embodiments, the concentration of $P_2O_5$ in the glass may be from about 1 mol % to about 10 mol % or even 1 mol % to about 5 mol %.

In embodiments where the alkali aluminosilicate glasses are formed from a combination of $Al_2O_3$, $Na_2O$, $SiO_2$, $B_2O_3$, and $P_2O_5$ (i.e., glasses where no $Ga_2O_3$ is present), the alkali aluminosilicate glasses may also include fluorine. Fluorine is added to these glass compositions as a softening agent that decreases the softening point of the alkali aluminosilicate glasses. In embodiments where fluorine is added to the alkali aluminosilicate glass composition, the fluorine may be present in an amount from about 1 mol % to about 6 mol %. In some embodiments, the concentration of fluorine may be from about 2.5 mol. % to about 6 mol %. In general, additions of fluorine to the alkali aluminosilicate glass composition may decrease the softening point of the glass composition by 20° C. per 1 mol % of fluorine.

Based on the foregoing, it should be understood that the constituent materials of the alkali aluminosilicate glass compositions described herein may be varied to produce glasses with lower softening points and decreased liquid coefficients of thermal expansion which enable glass articles formed from the glass compositions to be easily formed into complex shapes. These same compositions may also be ion-exchange strengthened to achieve a relatively high depth of layer and magnitude of compressive residual stress. Specific exemplary compositions of alkali aluminosilicate glasses will now be described.

The embodiments of alkali aluminosilicate glasses described herein comprise $SiO_2$ and $Na_2O$. In the exemplary alkali aluminosilicate glass compositions described herein, $SiO_2$ is present in the glass compositions in a concentration from about 40 mol % to about 70 mol %. $Na_2O$ is present in these exemplary glass compositions in a concentration of about 5 mol % to about 35 mol %, or from about 10 mol % to about 20 mol %. However, it should be understood that glass compositions may include other concentrations of $SiO_2$ and $Na_2O$, as described above.

In a first exemplary composition, the alkali aluminosilicate glass compositions described herein further comprise X mol % of $Ga_2O_3$ and Z mol % $Al_2O_3$, where $0 \leq X \leq 20$, $0 \leq Z \leq 25$, and $10 \leq (X+Z) \leq 25$. In one particular embodiment, $17 \leq (X+Z) \leq 24$. This exemplary composition may further comprise Y mol % of $B_2O_3$ and (10-Y) mol % $P_2O_5$ where Y is from about 0 to about 10.

In one particular embodiment, the ratio of the concentration of $B_2O_3$ to the concentration of $P_2O_5$ is such that Y/(10-Y) is less than or equal to 1.6. Glass compositions satisfying this ratio have a sufficiently low softening point which enables forming the alkali aluminosilicate glasses into complex shapes. In another embodiment, the concentration of $B_2O_3$ in the alkali aluminosilicate glass composition is less than about 6.2 mol % such that the alkali aluminosilicate glass has a sufficiently low softening point which enables forming the alkali aluminosilicate glass into complex shapes. In general, the softening point of the glass in this exemplary composition is less than about 900° C. or even less than about 870° C. Similarly, the alkali aluminosilicate glasses of this exemplary composition have a liquid coefficient of thermal expansion (CTE) of less than or equal to about 30 ppm/° C. at temperatures above the glass transition temperature of the alkali aluminosilicate glass. This relatively low liquid CTE, in conjunction with the low softening point, further enables the glasses in this exemplary composition to be formed into complex shapes. The glasses described by this exemplary glass composition generally have a liquidus temperature $\leq 1050°$ C., $\leq 1000°$ C., or even $\leq 980°$ C.

Moreover, the glasses described by this exemplary composition may be ion-exchange strengthened. For example, in some embodiments, glass articles formed from this exemplary glass composition may be ion-exchange strengthened to have a compressive stress greater than about 625 MPa and a depth of layer greater than about 30 μm. In other embodiments, the compressive stress may be greater than about 700 MPa. In still other embodiments, the depth of layer may be greater than about 45 μm.

In one particular embodiment of this exemplary alkali aluminosilicate glass composition, the glass composition does not contain $Ga_2O_3$ (i.e., X=0). In this embodiment, a ratio of the concentration of $Na_2O$ to the concentration of $Al_2O_3$ may be greater than or equal to about 1.5 or even greater than about 2.0. Moreover, in this embodiment, the glass composition may include sufficient amounts of $B_2O_3$ and $P_2O_5$ such that Y/(10-Y) is from about 0.2 to about 3.0 which enables articles formed from the glass composition to be ion-exchange strengthened to a depth of layer of greater than 80 μm or even greater than 100 μm. In some embodiments, articles formed from the glass composition may be ion-exchange strengthened to a depth of layer of 110 μm or more. In some embodiments of the glass composition which do not contain $Ga_2O_3$, the articles formed from the glass composition may be ion-exchange strengthened to achieve a depth of layer of greater than about 10 μm and a compressive stress of greater than about 500 μm.

In a second exemplary composition, the alkali aluminosilicate glass comprises $SiO_2$ in a concentration from about 40 mol % to about 70 mol % and $Na_2O$ in a concentration from at least 5 mol % to about 35 mol %, as described above. In some embodiments, the concentration of $SiO_2$ may be from about 50 mol % to about 65 mol %. In other embodiments, the concentration of $Na_2O$ may be from about 15 mol % to about 25 mol %. The alkali aluminosilicate glasses of this exemplary composition also comprise X mol % of $Ga_2O_3$ and Z mol % $Al_2O_3$, wherein $0 \leq X \leq 20$, $0 \leq Z \leq 25$, and $10 \leq (X+Z) \leq 25$, as described above. In one particular embodiment, a ratio of the concentration of $Na_2O$ to a sum of the concentrations of $Al_2O_3$ and $Ga_2O_3$ (i.e., mol % $Na_2O$/(mol % $Al_2O_3$+mol % $Ga_2O_3$)) is approximately 1 such that the softening point of the glass is sufficiently low. This exemplary glass composition also includes from about 1 mol % to about 10 mol % $B_2O_3$. However, glasses of this exemplary composition are formed without $P_2O_5$.

In these embodiments, the glasses contain sufficient amounts of $B_2O_3$ and $Ga_2O_3$ such that the glasses have softening points less than or equal to 900° C. or even less than or equal to 875° C. In some embodiments, the softening point of the glass may be less than or equal to 850° C.

Moreover, glass articles formed from this exemplary glass composition may be ion-exchange strengthened such that the glass article has a depth of layer $\geq 30$ μm or even $\geq 35$ μm. In some embodiments, the depth of layer may be $\geq 40$ μm. Further, the glass articles formed from this exemplary glass composition may be ion-exchange strengthened such that the glass article has a compressive stress $\geq 750$ MPa or even $\geq 800$ MPa. In some embodiments, the compressive stress is $\geq 850$ MPa.

In some embodiments of this exemplary glass composition, the liquid coefficient of thermal expansion of the glass formed from this exemplary alkali aluminosilicate glass composition is $\leq 30$ ppm/° C. or even $\leq 28$ ppm/° C. In some embodiments, the liquid coefficient of thermal expansion is $\leq 26$ ppm/° C.

In some embodiments of this exemplary glass composition the concentration of $Ga_2O_3$ may be such that $1 \leq X \leq 12$. In other embodiments of this exemplary glass composition the concentration of $Ga_2O_3$ may be such that $X \geq 4$ and the concentration of $Al_2O_3$ may be such that $Z \geq 7$.

In a third exemplary composition, the alkali aluminosilicate glass composition comprises $SiO_2$ in a concentration from about 40 mol % to about 70 mol % and $Na_2O$ in a concentration from at least about 5 mol % to about 35 mol %, as described above. In some embodiments, the concentration of $SiO_2$ may be from about 50 mol % to about 65 mol %. In other embodiments, the concentration of $Na_2O$ may be from about 15 mol % to about 25 mol %. The glasses of this exemplary composition also comprise from about X mol % of $Ga_2O_3$ and about Z mol % $Al_2O_3$, where $0 \leq X \leq 20$, $0 \leq Z \leq 25$, and $10 \leq (X+Z) \leq 25$, as described above. This exemplary glass composition also includes from about 1 mol % to about 10 mol % $P_2O_5$ or even from about 1 mol % to about 5 mol % $P_2O_5$. However, glasses of this exemplary composition are formed without $B_2O_3$. In these embodiments, the glasses contain sufficient amounts of $Ga_2O_3$ such that the glasses have softening points less than or equal to 975° C. or even less than or equal to 850° C. In some embodiments, the softening point of the glass may be less than or equal to 900° C.

In some embodiments of this exemplary composition, $P_2O_5$ may be present in an amount greater than or equal to about 4 mol %. In other embodiments of this exemplary glass composition, the concentration of $Ga_2O_3$ may be such that $X \geq 2$ and the concentration of $Al_2O_3$ may be such that $Z \geq 10$. In some other embodiments of this exemplary glass composition the concentration of $Ga_2O_3$ may be such that $X \leq 10$ and the concentration of $Al_2O_3$ may be such that $Z \leq 18$.

Moreover, glass articles formed from this exemplary glass composition may be ion-exchange strengthened. In some embodiments, after the glass is ion exchanged in a $KNO_3$ bath for 4 hours at a temperature of 410° C., the glass article has a depth of layer $\geq 55$ µm or even $\geq 60$ µm. In some embodiments, the depth of layer may be $\geq 65$ µm after ion-exchange strengthening for 4 hours under the aforementioned conditions. Further, the glass articles formed from this exemplary glass composition may be ion-exchange strengthened under the aforementioned conditions such that the glass article has a compressive stress $\geq 750$ MPa or even $\geq 800$ MPa. In some embodiments, the compressive stress may be $\geq 850$ MPa or even $\geq 900$ MPa.

In some embodiments of this exemplary glass composition, the liquid coefficient of thermal expansion of the glass formed from this exemplary alkali aluminosilicate glass composition is $\leq 25$ ppm/° C. or even $\leq 23$ ppm/° C. In some embodiments, the coefficient of thermal expansion is $\leq 20$ ppm/° C.

In a fourth exemplary composition, the alkali aluminosilicate glasses comprise $SiO_2$ in a concentration from about 40 mol % to about 70 mol % and $Na_2O$ in a concentration from at least about 10 mol % to about 20 mol %. The glasses of this exemplary composition also comprise $Al_2O_3$ in a concentration from about 10 mol % to about 20 mol %. This exemplary composition may further comprise about Y mol % of $B_2O_3$ and (5-Y) mol % $P_2O_5$ where Y is from about 0 to about 5. This exemplary composition also comprises fluorine which acts as a softening agent. Fluorine is present in this composition in an amount from about 1 mol % to about 6 mol % or even from about 2.5 mol % to about 6 mol %. In this exemplary composition $B_2O_3$ and fluorine may be present in the glass composition in amounts sufficient to lower the softening point of the glass to less than or equal to about 935° C. or even less than or equal to about 900° C. In some embodiments, the softening point of glass formed from this composition is less than or equal to 890° C. or even less than or equal to about 850° C. Moreover, glass articles formed from this exemplary composition may be ion-exchange strengthened to a depth of layer of about 40 µm and a compressive stress of about 1000 MPa.

Referring again to FIG. 1, the glass compositions described herein may be used to form glass articles 100, such as cover glasses for electronic devices, utilizing a fusion down-draw process, a slot-draw process or any other suitable process used for forming glass substrates from a batch of glass raw materials. For example, the alkali aluminosilicate glass compositions described herein may be formed into glass substrates using a fusion down-draw process. The fusion down-draw process utilizes a drawing tank that has a channel for accepting molten glass raw material. The channel has weirs that open at the top along the length of the channel on both sides of the channel. When the channel fills with molten glass, the molten glass overflows the weirs and, due to gravity, the molten glass flows down the outside surfaces of the drawing tank. These outside surfaces extend down and inwardly so that they join at an edge below the drawing tank. The two flowing glass surfaces join at this edge and fuse to form a single flowing sheet of molten glass which is further drawn to a desired thickness. The fusion draw method produces glass sheets with highly uniform, flat surfaces as neither surface of the resulting glass sheet is in contact with any part of the fusion apparatus.

Alternatively, the alkali aluminosilicate glass compositions described herein may be formed using a slot-draw process which is distinct from the fusion down-draw process. In the slot-draw process molten glass is supplied to a drawing tank. The bottom of the drawing tank has an open slot with a nozzle that extends the length of the slot. The molten glass flows through the slot/nozzle and is drawn downward as a continuous sheet and into an annealing region.

In some embodiments, after the glass substrate is formed, the glass substrate may be further processed and shaped into a complex 3-dimensional shape such as, for example, a concave shape, a convex shape or another desired geometry. The formation of the glass substrate into a glass article having the aforementioned complex shapes is enabled by the relatively low softening point and low liquid coefficient of thermal expansion of the alkali aluminosilicate glass compositions described herein.

Moreover, the glass articles formed from the alkali aluminosilicate glass compositions described herein, such as glass substrates and/or shaped glass articles, may be strengthened by ion-exchange. As used herein, the term "ion-exchange strengthened" means that the glass is strengthened by an ion-exchange process as is known in the art of glass fabrication. Such ion-exchange processes include, but are not limited to, treating the alkali aluminosilicate glass articles with a heated solution containing ions having a larger ionic radius than ions that are present in the glass surface, thus replacing the smaller ions with the larger ions. Potassium ions, for example, could replace sodium ions in the glass. Alternatively, other alkali metal ions having larger atomic radii, such as rubidium or cesium, could replace smaller alkali metal ions in the glass. Similarly, other alkali metal salts such as, but not limited to, sulfates, halides, and the like may be used in the ion-exchange process. In one embodiment, the glass is chemically strengthened by placing it in a molten salt bath comprising $KNO_3$ for a predetermined time period to achieve ion-exchange. In one embodiment, the temperature of the molten salt bath is about 430° C., although other temperatures may be used (i.e., 410° C., 420° C., etc.). The residence time of the glass article in the molten salt bath may vary depending on the desired magnitude of compressive residual stress and depth of layer.

EXAMPLES

The compositions and properties of the aforementioned alkali aluminosilicate glass compositions will be further clarified with reference to the following examples.

In the glasses described in the following examples, Si was batched as sand, Al as alumina, Na as both soda ash and sodium nitrate, B as boric acid, P as aluminum metaphosphate, Ga as gallium oxide and F as aluminum fluoride. The batch materials were melted at 1600° C. for four hours and then poured and annealed between 550° C. and 650° C. The glass compositions were analyzed by inductively coupled plasma and/or atomic absorption techniques to determine the mol % of the constituent materials in each composition. Physical properties such as the softening point, annealing point, strain point, liquid CTE and density were then measured. The glasses were ion-exchange strengthened in a $KNO_3$ salt bath for 8 to 16 hours at temperatures between 400° C. and 430° C. The depth of layer and compressive stress were then determined Values for the depth of layer (DOL) and compressive stress (CS) are reported in μm and MPa, respectively.

Table 1 below contains data demonstrating the decrease in softening point when $Ga_2O_3$ is substituted for $Al_2O_3$ in the alkali aluminosilicate glasses described herein. In this example, the alkali aluminosilicate glass generally had a composition which included: from about 40 mol % to about 70 mol % $SiO_2$; from about 5 mol % to about 35 mol % $Na_2O$; X mol % of $Ga_2O_3$ and Z mol % $Al_2O_3$, wherein $0 \leq X \leq 20$, $0 \leq Z \leq 25$, and $10 \leq (X+Z) \leq 25$; and from about 1 mol % to about 10 mol % $B_2O_3$, as described above. The specific compositional characteristics of the glass are listed in Table 1.

TABLE 1

Substitution of $Ga_2O_3$ for $Al_2O_3$ in glasses containing only $B_2O_3$

| | Sample | | | | | | |
|---|---|---|---|---|---|---|---|
| | A | B | C | D | E | F | G |
| $SiO_2$ (mol %) | 51 | 50 | 50 | 53 | 51 | 50 | 53 |
| $Al_2O_3$ (mol %) | 20 | 18 | 15 | 15 | 14 | 10 | 8 |
| $Na_2O$ (mol %) | 19 | 20 | 20 | 19 | 19 | 21 | 18 |
| $B_2O_3$ (mol %) | 10 | 10 | 10 | 9 | 9 | 10 | 9 |
| $Ga_2O_3$ (mol %) | 0 | 3 | 5 | 5 | 7 | 10 | 12 |
| Softening Pt. (° C.) | 850 | 817 | 790 | 815 | 816 | 761 | 790 |
| Annealing Pt. (° C.) | 609 | 594 | 579 | 593 | 603 | 560 | 585 |
| Strain Pt. (° C.) | 559 | 545 | 532 | 545 | 554 | 515 | 538 |

Figure 4:
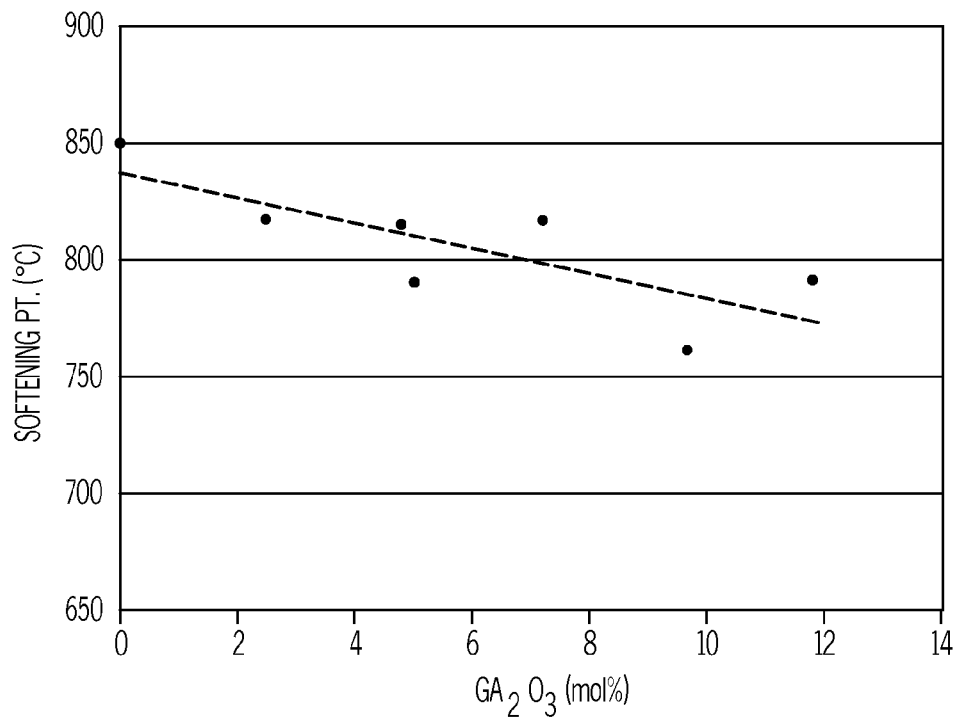
FIG. 4 graphically depicts the softening point of an alkali aluminosilicate glass composition as a function of the concentration of $Ga_2O_3$.

Softening point data for the exemplary compositions listed in Table 1 are plotted as a function of the concentration of $Ga_2O_3$ in FIG. 4. As shown in FIG. 4, the substitution of $Ga_2O_3$ for $Al_2O_3$ in the alkali aluminosilicate glass composition generally decreases the softening point of the glass by about 5.5° C. per 1 mol % $Ga_2O_3$.

Table 2 below contains data demonstrating the decrease in softening point when $B_2O_3$ is substituted for $P_2O_5$ in the alkali aluminosilicate glasses. In this example, the alkali aluminosilicate glass generally had a composition which included: from about 40 mol % to about 70 mol % $SiO_2$; from about 5 mol % to about 35 mol % $Na_2O$; X mol % of $Ga_2O_3$ and Z mol % $Al_2O_3$, where $0 \leq X \leq 20$, $0 \leq Z \leq 25$, and $10 \leq (X+Z) \leq 25$; and Y mol % $B_2O_3$ and (10-Y) mol % $P_2O_5$ where Y is from about 0 to approximately 10.

TABLE 2

Substitution of $B_2O_3$ for $P_2O_5$ with and without additions of $Ga_2O_3$

| | Sample | | | | | | | |
|---|---|---|---|---|---|---|---|---|
| | H | I | J | D | K | L | M | N |
| $SiO_2$ (mol %) | 50 | 49 | 51 | 53 | 52 | 52 | 53 | 51 |
| $Al_2O_3$ (mol %) | 16 | 18 | 16 | 15 | 18 | 19 | 16 | 20 |
| $Na_2O$ (mol %) | 19 | 19 | 19 | 19 | 20 | 20 | 20 | 19 |
| $B_2O_3$ (mol %) | 0 | 2 | 7 | 9 | 3 | 5 | 8 | 10 |
| $P_2O_5$ (mol %) | 10 | 7 | 2 | 0 | 7 | 5 | 3 | 0 |
| $Ga_2O_3$ (mol %) | 5 | 5 | 5 | 5 | 0 | 0 | 0 | 0 |
| $B_2O_3/P_2O_5$ | 0.0 | 0.3 | 2.8 | — | 0.4 | 1.0 | 3.0 | — |
| Softening Pt. (° C.) | 861 | 851 | 830 | 815 | 862 | 843 | 821 | 793 |
| Annealing Pt. (° C.) | 620 | 607 | 600 | 593 | 597 | 598 | 568 | 573 |
| Strain Pt. (° C.) | 570 | 556 | 550 | 545 | 545 | 546 | 523 | 528 |
| Density (gm/$cm_3$) | 2.552 | 2.555 | 2.564 | 2.558 | 2.419 | 2.421 | 2.427 | NA |

Figure 5:
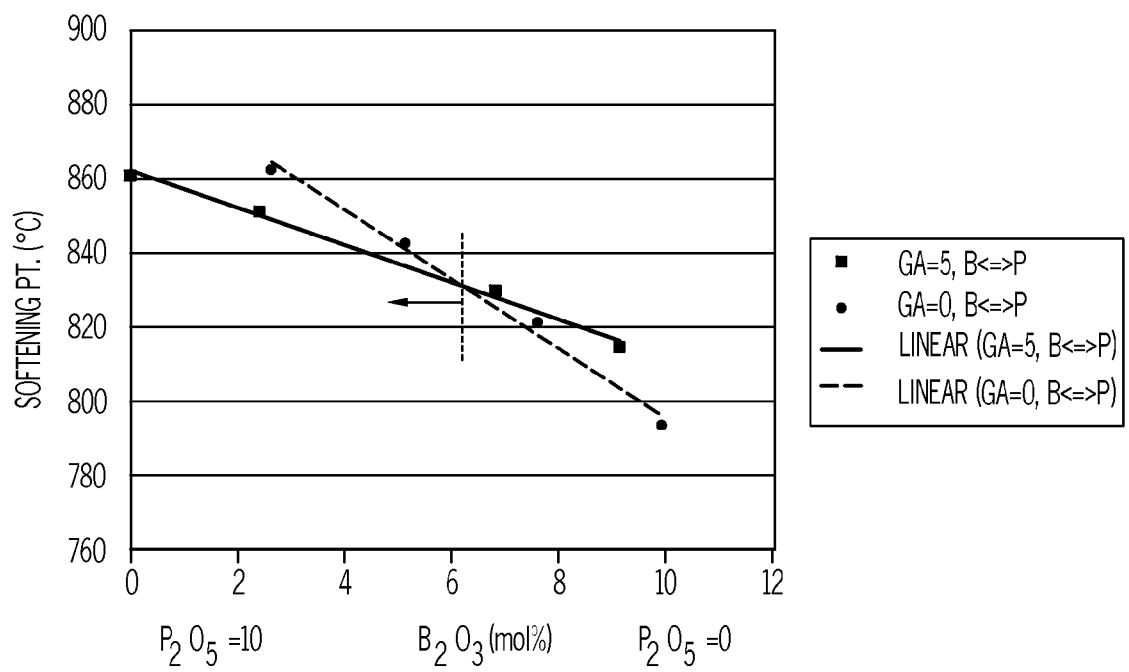
FIG. 5 graphically depicts the softening point as a function of the concentration of $B_2O_3$ for alkali aluminosilicate glass compositions with 5 mol % $Ga_2O_3$ and 0 mol % $Ga_2O_3$.

FIG. 5 graphically depicts the softening point plotted as a function of the concentration of $B_2O_3$ as the $B_2O_3$ is substituted for $P_2O_5$ for $Ga_2O_3$ concentrations of 5 mol % (solid line) and 0 mol % (dashed line). As shown in FIG. 5, the softening point of the alkali aluminosilicate glass composition generally decreases as $B_2O_3$ is substituted for $P_2O_5$ for $Ga_2O_3$ concentrations of 5 mol % and 0 mol %. The vertical line delineates compositions where the softening point is generally lower for those glass compositions which also contain $Ga_2O_3$. In this region (i.e., the region to the left of the vertical line), the ratio of the concentration of $B_2O_3$ to the concentration of $P_2O_5$ (i.e., Y/(10-Y)) is generally less than 1.6. Similarly, the concentration of $B_2O_3$ in this region is less than 6.2 mol %.

Table 3 below contains data relating to the depth of layer and compressive stress following ion-exchange for glasses having the compositions listed in Table 2 above. Samples of each glass composition were ion-exchange strengthened in a 100% $KNO_3$ bath at 410° C. for 4, 6, 8 and 16 hours. Each sample was ion-exchange strengthened to determine the shortest and coolest condition that would yield a depth of layer ≥ 40 μm and a compressive stress ≥ 800 MPa. Conventional (i.e., non-inventive) aluminosilicate glasses are generally ion-exchange strengthened for 8 hours under these conditions to achieve a depth of layer of at least 40 μm and a compressive stress greater than or equal to 800 MPa.

TABLE 3

Ion-exchange Data

| | Sample | | | | | | | |
|---|---|---|---|---|---|---|---|---|
| | H | I | J | D | K | L | M | N |
| SiO$_2$ (mol %) | 50 | 49 | 51 | 53 | 52 | 52 | 53 | 51 |
| Al$_2$O$_3$ (mol %) | 16 | 18 | 16 | 15 | 18 | 19 | 16 | 20 |
| Na$_2$O (mol %) | 19 | 19 | 19 | 19 | 20 | 20 | 20 | 19 |
| B$_2$O$_3$ (mol %) | 0 | 2 | 7 | 9 | 3 | 5 | 8 | 10 |
| P$_2$O$_5$ (mol %) | 10 | 7 | 2 | 0 | 7 | 5 | 3 | 0 |
| Ga$_2$O$_3$ (mol %) | 5 | 5 | 5 | 5 | 0 | 0 | 0 | 0 |
| Softening Pt. (° C.) | 861 | 851 | 830 | 815 | 862 | 843 | 821 | 793 |
| Annealing Pt. (° C.) | 620 | 607 | 600 | 593 | 597 | 598 | 568 | 573 |
| Strain Pt. (° C.) | 570 | 556 | 550 | 545 | 545 | 546 | 523 | 528 |
| Density (gm/cm$_3$) | 2.552 | 2.555 | 2.564 | 2.558 | 2.419 | 2.421 | 2.427 | — |
| IX 410° C. 4 hrs: DOL/CS | 58/781 | 49/864 | | | 68/725 | 47/795 | | |
| IX 410° C. 6 hrs: DOL/CS | 81/747 | 65/831 | | | | 60/790 | | |
| IX 410° C. 8 hrs: DOL/CS | 88/727 | 72/807 | 45/901 | 33/955 | 90/704 | 70/747 | 51/778 | 35/924 |
| IX 410° C. 16 hrs: DOL/CS | | 100/764 | 64/839 | 46/914 | 117/667 | 97/698 | 66/766 | |

Figure 6:
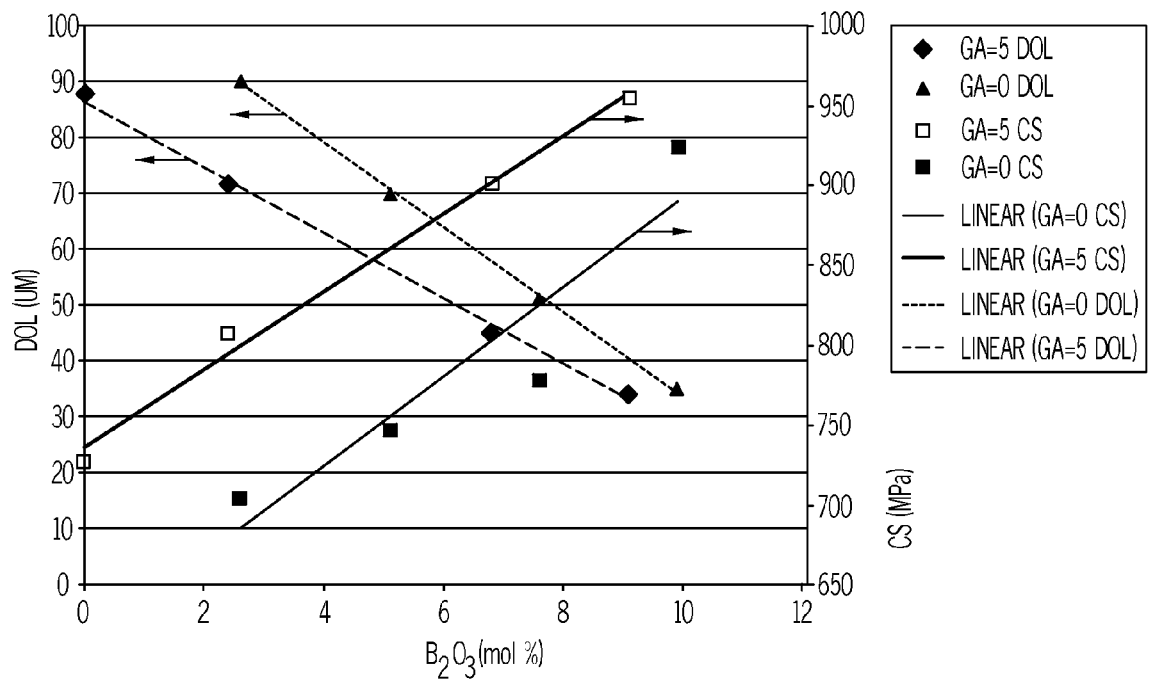
FIG. 6 graphically depicts the depth of layer and compressive stress as a function of the concentration of $B_2O_3$ for alkali aluminosilicate glass compositions with 5 mol % $Ga_2O_3$ and 0 mol % $Ga_2O_3$.

FIG. 6 graphically depicts the depth of layer and compressive stress (y-axis) developed in the glass samples as a function of the concentration of B$_2$O$_3$ for gallium concentrations of 5 mol % and 0 mol %. The values for the compressive stress have been corrected to account for the stress optic coefficient (SOC) of each composition. As shown in FIG. 6, the depth of layer and the compressive stress generally have an inverse relationship. That is, when the depth of layer increases, the compressive stress decreases. The compressive stress is significantly higher for those glasses containing Ga$_2$O$_3$ than for those glasses which are Ga$_2$O$_3$ free without a corresponding reduction in the depth of layer. For example, Sample J had 5 mol % Ga$_2$O$_3$ and a corresponding compressive stress of 901 MPa and a depth of layer of 45 µm after ion-exchange strengthening for 8 hours. In contrast, Sample O had 0 mol % Ga$_2$O$_3$ and a corresponding compressive stress of 747 MPa and a depth of layer of 51 µm under the same ion-exchange conditions. In general, the data presented in Table 3 demonstrate that the alkali aluminosilicate glasses containing Ga$_2$O$_3$ described herein may be more rapidly ion-exchanged to achieve a depth of layer of greater than 40 µm and/or a compressive residual stress of greater than 800 relative to conventional alkali aluminum silicate glasses.

Table 4 contains data relating to the liquidus temperature and the high temperature CTE of the alkali aluminosilicate glass compositions listed in Table 2, above.

TABLE 4

Liquidus Temperature and High Temperature CTE

| | Sample | | | | | | | |
|---|---|---|---|---|---|---|---|---|
| | H | I | J | D | K | L | M | N |
| SiO$_2$ (mol %) | 50 | 49 | 51 | 53 | 52 | 52 | 53 | 51 |
| Al$_2$O$_3$ (mol %) | 16 | 18 | 16 | 15 | 18 | 19 | 16 | 20 |
| Na$_2$O (mol %) | 19 | 19 | 19 | 19 | 20 | 20 | 20 | 19 |
| B$_2$O$_3$ (mol %) | 0 | 2 | 7 | 9 | 3 | 5 | 8 | 10 |
| P$_2$O$_5$ (mol %) | 10 | 7 | 2 | 0 | 7 | 5 | 3 | 0 |
| Ga$_2$O$_3$ (mol %) | 5 | 5 | 5 | 5 | 0 | 0 | 0 | 0 |
| Softening Pt. (° C.) | 861 | 851 | 830 | 815 | 862 | 843 | 821 | 793 |
| Annealing Pt. (° C.) | 620 | 607 | 600 | 593 | 597 | 598 | 568 | 573 |
| Strain Pt. (° C.) | 570 | 556 | 550 | 545 | 545 | 546 | 523 | 528 |
| Density (gm/cm$_3$) | 2.552 | 2.555 | 2.564 | 2.558 | 2.419 | 2.421 | 2.427 | NA |
| Liquidus (° C.) | no devit >875 | no devit >765 | NA | 980.0 | NA | NA | 965 | 1050 |
| Liquid (>Tg) Instantaneous CTE pt | NA | 24 | 25 | 28 | NA | 26 | 29 | NA |

The data contained in Table 4 demonstrate that the alkali aluminosilicate glass compositions containing Ga$_2$O$_3$ generally have a lower liquidus temperature than those compositions without Ga$_2$O$_3$. In all cases, the liquidus temperature of the glass compositions was sufficiently low to enable the glass compositions to be formed using down-draw processes such as the fusion down-draw process and the slot-draw process.

Moreover, the data in Table 4 also indicate that the liquid CTE of the glass compositions above the glass transition temperature was generally less than 30 ppm/° C. with the glasses containing Ga$_2$O$_3$ generally having lower values than the glasses without Ga$_2$O$_3$. These liquid CTE values indicate that the glass compositions would be well suited for use in 3-dimensional forming process where lower liquid CTE values are desired.

Table 5 contains data relating to the composition and properties of alkali aluminosilicate glass compositions containing fluorine. In this example, the alkali aluminosilicate glasses generally had a composition which included: from about 40 mol % to about 70 mol % $SiO_2$; from about 10 mol % to about 20 mol % $Na_2O$; from about 10 mol % to about 20 mol % $Al_2O_3$; Y mol % of $B_2O_3$ and (5-Y) mol % $P_2O_5$, wherein $0 \leq Y \leq 5$; and from about 1 mol % to about 6 mol % fluorine, as described above.

TABLE 5

Composition and Properties of Glasses Containing Fluorine

| | Sample | | | | |
|---|---|---|---|---|---|
| | O | P | Q | R | S |
| $SiO_2$ (mol %) | 60 | 61 | 59 | 60 | 60 |
| $Al_2O_3$ (mol %) | 17 | 16 | 16 | 15 | 15 |
| $Na_2O$ (mol %) | 17 | 16 | 16 | 16 | 16 |
| $B_2O_3$ (mol %) | 5 | 5 | 5 | 3 | 0 |
| $P_2O_5$ (mol %) | 0 | 0 | 0 | 3 | 5 |
| F (mol %) | 0 | 3 | 5 | 6 | 6 |
| $Na_2O/Al_2O_3$ | 1.0 | 1.0 | 1.0 | 1.1 | 1.1 |
| Softening Pt. (° C.) | 934 | 886 | 840 | 833 | 851 |
| Annealing Pt. (° C.) | 681 | 585 | 550 | 560 | 560 |
| Strain Pt. (° C.) | 621 | 532 | 500 | 506 | 505 |
| Density (gm/cm3) | 2.414 | 2.405 | 2.404 | NA | NA |
| IX 410° C. 8 hrs: DOL/CS | | | | 46/712 | 57/546 |
| IX 410° C. 16 hrs: DOL/CS | 69/1095 | 47/1068 | 43/1034 | | |

Figure 7:
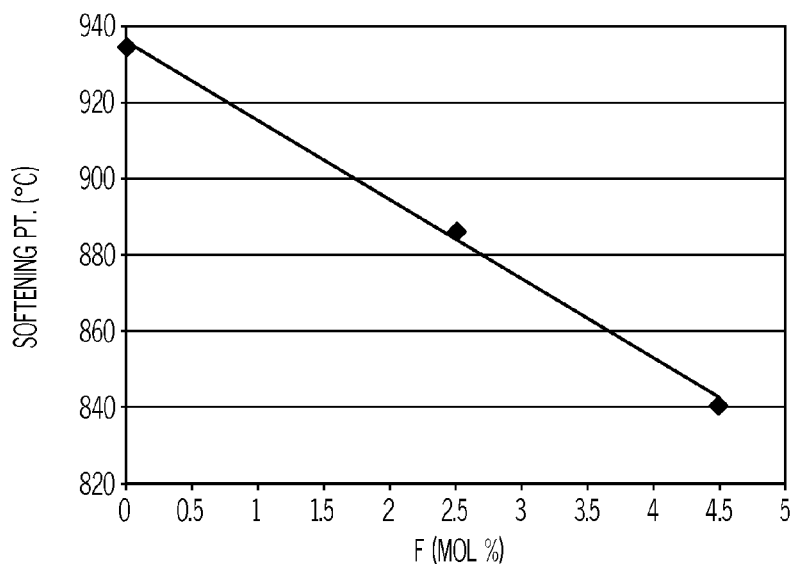
FIG. 7 graphically depicts the softening point as a function of the concentration of fluorine for an alkali aluminosilicate glass composition.

FIG. 7 graphically depicts the softening point data plotted as a function of the concentration of fluorine for the alkali aluminosilicate glasses listed in Table 5. As shown in FIG. 7, the softening point of the glasses generally decreases by about 20° C. per 1 mol % of fluorine. Moreover, the data in Table 5 also indicate that the addition of fluorine has very little impact on the magnitude of compressive stress imparted to the glass and only slightly decreases the depth of layer obtained.

Table 6 contains data relating to the properties of alkali aluminosilicate glass compositions containing $B_2O_3$. In this example, the alkali aluminosilicate glass generally had a composition which included: from about 40 mol % to about 70 mol % $SiO_2$; from about 5 mol % to about 35 mol % $Na_2O$; from about 10 mol % to about 25 mol % $Al_2O_3$; and about 2 mol % to about 5 mol % $B_2O_3$. The amounts of $Na_2O$ and $Al_2O_3$ were varied such that the ratio of the concentration of $Na_2O$ to the ratio of the concentration of $Al_2O_3$ was from about 0.5 to about 2.6.

TABLE 6

Composition and Properties of Glasses Containing $B_2O_3$

| | Sample | | | | |
|---|---|---|---|---|---|
| | T | U | V | W | X |
| $SiO_2$ (mol %) | 60 | 50 | 56 | 56 | 65 |
| $Al_2O_3$ (mol %) | 11 | 20 | 20 | 25 | 20 |
| $Na_2O$ (mol %) | 27 | 25 | 19 | 14 | 10 |
| $B_2O_3$ (mol %) | 3 | 5 | 5 | 5 | 5 |
| $Na_2O/Al_2O_3$ | 2.6 | 1.3 | 1.0 | 0.6 | 0.5 |
| Softening Pt. (° C.) | 668 | NA | 927 | 924 | 970 |
| Annealing Pt. (° C.) | 513 | 588 | 667 | 699 | 710 |
| Strain Pt. (° C.) | 478 | 545 | 610 | 646 | 653 |
| Density (gm/cm3) | 2.501 | 2.475 | 2.437 | 2.454 | 2.403 |
| IX 410° C. 8 hrs: DOL/CS | 53/81 | 32/982 | 37/1183 | 18/964 | 30/738 |
| IX 410° C. 16 hrs: DOL/CS | 54/71 | 43/902 | | 25/963 | 37/635 |
| IX 430° C. 8 hrs: DOL/CS | 98/NA | 37/918 | 25/NA | 23/939 | 35/601 |

Figure 8:
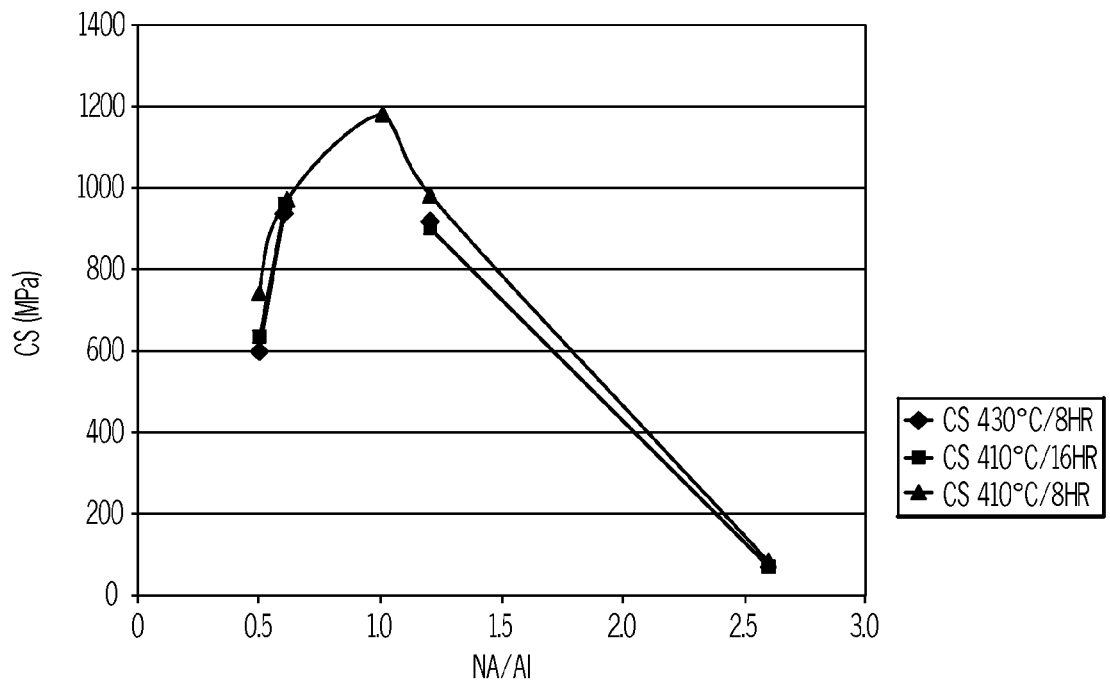
FIG. 8 graphically depicts the compressive stress as a function of the ratio of the concentration of $Na_2O$ to the concentration of $Al_2O_3$ for an alkali aluminosilicate glass containing different concentrations of $B_2O_3$.

Referring to FIG. 8, the amount of compressive stress introduced in the glass as a result of different ion-exchange conditions (i.e., time and temperature) is graphically depicted as a function of the ratio of the concentration of $Na_2O$ to the concentration of $Al_2O_3$ for the glass compositions in Table 6. As shown in FIG. 8, the compressive stress is a maximum when the ratio is approximately 1.

Figure 9:
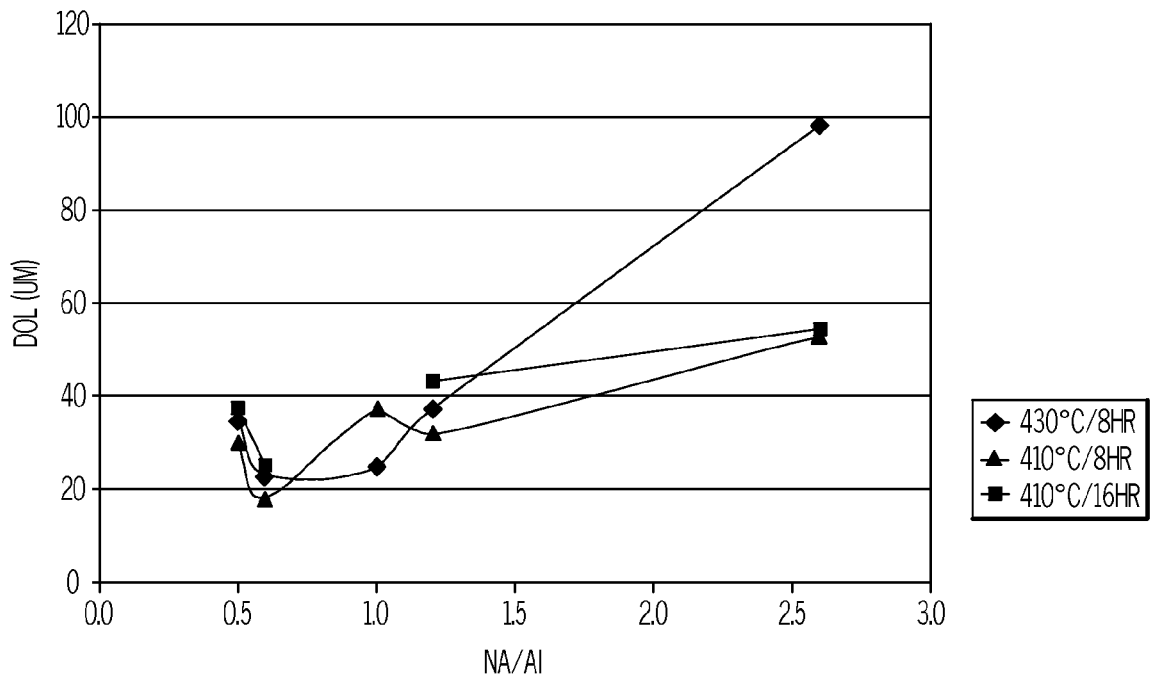
FIG. 9 graphically depicts the depth of layer as a function of the ratio of the concentration of $Na_2O$ to the concentration of $Al_2O_3$ for alkali aluminosilicate glass containing different concentrations of $B_2O_3$.

Referring to FIG. 9, by way of contrast, the depth of layer in the glass as a result of the same ion-exchange conditions (i.e., time and temperature) is graphically depicted as a function of the ratio of the concentration of $Na_2O$ to the concentration of $Al_2O_3$ for the glass compositions in Table 6. As shown in FIG. 9, the depth of layer increases when the ratio is greater than or equal to about 1.5 which generally corresponds to a depth of layer greater than 10 μm and compressive stress of greater than 500 MPa (FIG. 8).

Table 7 contains data relating to the properties of alkali aluminosilicate glass compositions containing $B_2O_3$. In this example, the alkali aluminosilicate glass generally had a composition which included: from about 40 mol % to about 70 mol % $SiO_2$; from about 5 mol % to about 35 mol % $Na_2O$; from about 10 mol % to about 25 mol % $Al_2O_3$, and about 8 mol % to about 10 mol % $B_2O_3$. The amounts of $Na_2O$ and $Al_2O_3$ were varied such that the ratio of the concentration of $Na_2O$ to the ratio of the concentration of $Al_2O_3$ was from about 0.5 to about 3.5.

TABLE 7

Composition and Properties of Glasses Containing $B_2O_3$

| | Sample | | | | | | | |
|---|---|---|---|---|---|---|---|---|
| | Y | Z | AA | BB | CC | DD | EE | FF |
| $SiO_2$ (mol %) | 69 | 55 | 66 | 56 | 66 | 61 | 65 | 76 |
| $Al_2O_3$ (mol %) | 5 | 14 | 10 | 15 | 13 | 15 | 15 | 10 |
| $Na_2O$ (mol %) | 18 | 23 | 14 | 19 | 12 | 14 | 10 | 5 |
| $B_2O_3$ (mol %) | 9 | 9 | 10 | 10 | 10 | 10 | 10 | 10 |
| $Na_2O/Al_2O_3$ | 3.5 | 1.6 | 1.4 | 1.2 | 0.9 | 1.0 | 0.7 | 0.5 |
| Softening Pt. (° C.) | 708 | 688 | 752 | 728 | 884 | 868 | 906 | 980 |
| Annealing Pt. (° C.) | 560 | 542 | 569 | 560 | 590 | 601 | 623 | 641 |
| Strain Pt. (° C.) | 525 | 509 | 526 | 524 | 533 | 546 | 566 | 577 |
| IX 410° C. 8 hrs: DOL/CS | 19/789 | 37/665 | 26/785 | 21/813 | 37/676 | 29/934 | 19/586 | |
| IX 410° C. 16 hrs: DOL/CS | 34/616 | 49/602 | 38/725 | 29/844 | 49/622 | 12/642 | 27/545 | 26/152 |
| IX 430° C. 8 hrs: DOL/CS | 32/408 | 37/918 | 33/684 | 40/650 | | 47/769 | | 17/315 |
| IX 430° C. 16 hrs: DOL/CS | 42/158 | 81/1099 | 44/630 | 36/798 | | 40/877 | | 26/159 |

Figure 10:
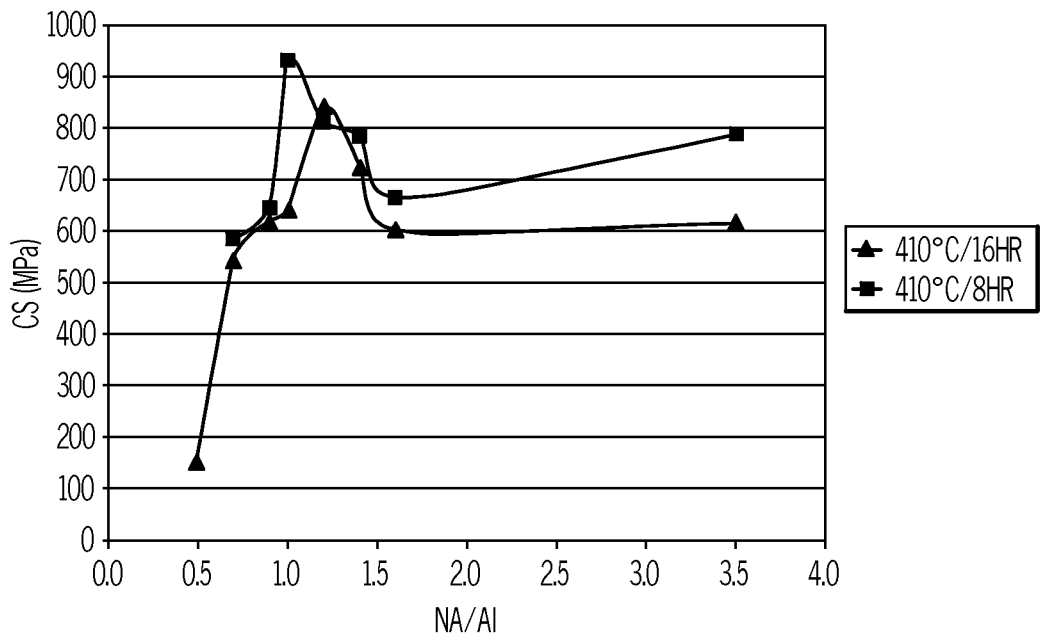
FIG. 10 graphically depicts the compressive stress of alkali aluminosilicate glass as a function of the ratio of the concentration of $Na_2O$ to the concentration of $Al_2O_3$ for alkali aluminosilicate glass containing different concentrations of $B_2O_3$.

Referring to FIG. 10, the amount of compressive stress introduced in the glass as a result of different ion-exchange conditions (i.e., time and temperature) is graphically depicted as a function of the ratio of the concentration of $Na_2O$ to the concentration of $Al_2O_3$ for the glass compositions in Table 7. As shown in FIG. 10, the compressive stress is a maximum when the ratio is approximately 1, similar to the alkali aluminosilicate glass compositions described in Table 6.

Figure 11:
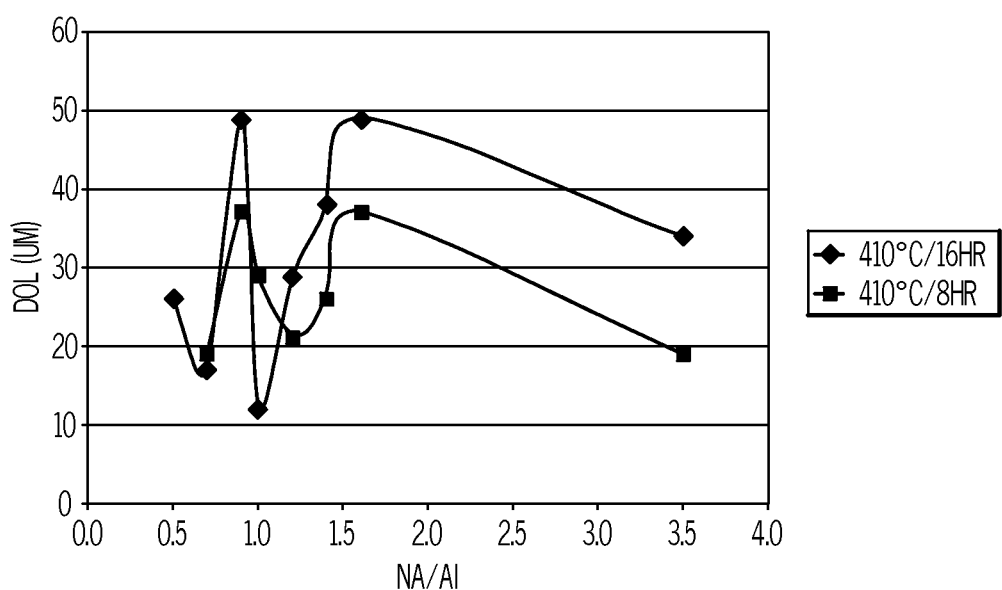
FIG. 11 graphically depicts the compressive stress of alkali aluminosilicate glass as a function of the ratio of the concentration of $Na_2O$ to the concentration of $Al_2O_3$ for alkali aluminosilicate glass containing different concentrations of $B_2O_3$.

Referring to FIG. 11, by way of contrast, the depth of layer in the glass as a result of the same ion-exchange conditions (i.e., time and temperature) is graphically depicted as a function of the ratio of the concentration of $Na_2O$ to the concentration of $Al_2O_3$ for the glass compositions in Table 7. As shown in FIG. 11, the depth of layer is a maximum when the ratio is about 1.5 which generally corresponds to a depth of layer greater than 50 μm and compressive stress of greater than 800 MPa (FIG. 10). However, for ratios greater than 1.5, the depth of layer gradually decreases.

Table 8 contains data relating to the properties of alkali aluminosilicate glass compositions containing $B_2O_3$ and $P_2O_5$. In this example, the alkali aluminosilicate glass generally had a composition which included: from about 40 mol % to about 70 mol % $SiO_2$; from about 5 mol % to about 35 mol % $Na_2O$; about 10 mol % $Al_2O_3$; and Y mol % $B_2O_3$ and (10-Y) mol % $P_2O_5$ where Y is from about 0 to approximately 10. The ratio of the concentration of $B_2O_3$ to the concentration of $P_2O_5$ was varied from about 0.3 to about 2.2. Similarly, the amounts of $Na_2O$ and $Al_2O_3$ were varied such that the ratio of the concentration of $Na_2O$ to the concentration of $Al_2O_3$ was from about 0.5 to about 3.5. The data in Table 8 indicate that additions of $P_2O_5$ significantly increase the depth of layer following ion-exchange strengthening at 410° C. for 16 hours.

TABLE 8

Composition and Properties of Glass Containing $B_2O_3$ and $P_2O_5$

| | Sample | | | |
|---|---|---|---|---|
| | GG | HH | II | JJ |
| $SiO_2$ (mol %) | 47 | 54 | 52 | 50 |
| $Al_2O_3$ (mol %) | 13 | 10 | 10 | 10 |
| $Na_2O$ (mol %) | 31 | 28 | 29 | 30 |
| $B_2O_3$ (mol %) | 9 | 5 | 5 | 3 |
| $P_2O_5$ (mol %) | 0 | 3 | 5 | 8 |
| $B_2O_3/P_2O_5$ | — | 2.2 | 0.9 | 0.3 |
| $Na_2O/Al_2O_3$ | 2.3 | 2.8 | 3.0 | 2.9 |
| Softening Pt. (° C.) | 590* | 678 | 767.2 | 867.4 |
| Annealing Pt. (° C.) | 489* | 514.7 | 553.7 | 577.5 |
| Strain Pt. (° C.) | 456* | 478.2 | 515.2 | 534.3 |
| Density (gm/cm₃) | NA | 2.5 | 2.5 | 2.5 |
| IX 410° C. 16 hrs: DOL/CS | NA | 101/90 | 94/467 | 119/19 |

*Modeled

Table 9 contains data relating to the properties of alkali aluminosilicate glass compositions containing $P_2O_5$ without containing $B_2O_3$. $Ga_2O_3$ was also substituted for $Al_2O_3$ in some compositions. In this example, the alkali aluminosilicate glass generally had a composition which included: from about 40 mol % to about 70 mol % $SiO_2$; from about 5 mol % to about 35 mol % $Na_2O$; X mol % of $Ga_2O_3$ and Z mol % $Al_2O_3$, where $0 \leq X \leq 20$, $0 \leq Z \leq 25$, and $10 \leq (X+Z) \leq 25$; and from about 1 mol % to about 10 mol % $P_2O_5$. The data in Table 9 generally indicate that additions of $P_2O_5$ significantly increase the depth of layer which may be obtained by ion-exchange strengthening for all ion-exchange conditions.

TABLE 9

Composition and Properties of Glass Containing $P_2O_5$ without $B_2O_3$

| | Sample | | | | | |
|---|---|---|---|---|---|---|
| | KK | LL | MM | NN | OO | PP |
| $SiO_2$ (mol %) | 62 | 61 | 60 | 52 | 52 | 54 |
| $Al_2O_3$ (mol %) | 16 | 15 | 13 | 17 | 14 | 11 |
| $Na_2O$ (mol %) | 17 | 17 | 17 | 20 | 19 | 19 |
| $P_2O_5$ (mol %) | 5 | 5 | 5 | 10 | 10 | 10 |
| $Ga_2O_3$ (mol %) | 0 | 2 | 5 | 2 | 5 | 7 |
| Softening Pt. (° C.) | 961 | 969 | 932 | 881 | 861 | 838 |
| Annealing Pt. (° C.) | 696 | 674 | 683 | 622 | 621 | 610 |
| Strain Pt. (° C.) | 639 | 621 | 628 | 573 | 571 | 561 |
| Liquid (>Tg) Instantaneous CTE pt | 19.5 | 20.0 | 21.2 | 22.7 | 23.4 | 23.6 |
| IX 410° C. 4 hrs: DOL/CS | 66/NA | 62/950 | 59/912 | 67/835 | 61/826 | 60/779 |
| IX 410° C. 8 hrs: DOL/CS | | 89/NA | 83/880 | 97/776 | 95/773 | 78/750 |
| IX 410° C. 16 hrs: DOL/CS | | 116/NA | 110/NA | 125/762 | 117/714 | 117/692 |

Table 10 contains data relating to the properties of alkali aluminosilicate glass compositions containing $B_2O_3$ without also containing $P_2O_5$. $Ga_2O_3$ was also substituted for $Al_2O_3$ in some compositions. In this example, the alkali aluminosilicate glass generally had a composition which included: from about 40 mol % to about 70 mol % $SiO_2$; from about 5 mol % to about 35 mol % $Na_2O$; X mol % of $Ga_2O_3$ and Z mol % $Al_2O_3$, where $0 \leq X \leq 20$, $0 \leq Z \leq 25$, and $10 \leq (X+Z) \leq 25$; and from about 1 mol % to about 10 mol % $B_2O_3$. The data in Table 10 generally indicate that additions of $B_2O_3$ generally decrease the softening point of the glass to less than 875° C.

TABLE 10

Composition and Properties of Glass Containing $B_2O_3$ without $P_2O_5$

| | Sample | | | | | |
|---|---|---|---|---|---|---|
| | QQ | RR | SS | TT | UU | VV |
| $SiO_2$ (mol %) | 53 | 49 | 51 | 52 | 51 | 65 |
| $Al_2O_3$ (mol %) | 21 | 23 | 19 | 15 | 12 | 7 |
| $Na_2O$ (mol %) | 22 | 21 | 21 | 21 | 22 | 12 |
| $B_2O_3$ (mol %) | 5 | 5 | 4 | 5 | 5 | 10 |
| $P_2O_5$ (mol %) | 0 | 0 | 0 | 0 | 0 | 0 |
| $Ga_2O_3$ (mol %) | 0 | 2 | 5 | 7 | 10 | 5 |
| $K_2O$ (mol %) | 0 | 0 | 0 | 0 | 0 | 1 |
| Softening Pt. (° C.) | 806 | 865 | 867 | 849 | 841 | 784 |
| Annealing Pt. (° C.) | 586 | 634 | 638 | 630 | 630 | 558 |
| Strain Pt. (° C.) | 541 | 583 | 588 | 581 | 581 | 510 |
| Liquid (>Tg) Instantaneous CTE pt | 27.7 | 26.2 | 25.2 | 27.9 | 25.3 | 28.7 |
| IX 410° C. 8 hrs: DOL/CS | 37/796 | 40/890 | 39/868 | 36/865 | 34/839 | 25/556 |
| IX 410° C. 16 hrs: DOL/CS | 52/764 | 60/857 | 54/865 | 52/860 | 47/833 | 34/531 |

Based on the foregoing, it should now be understood that embodiments described herein relate to glass articles formed from alkali aluminosilicate glasses which may be ion-exchange strengthened. In some embodiments, the glass articles described herein have relatively low softening temperatures, relatively low liquidus temperatures, and relatively low CTEs above the glass transition temperature, all of which enable the glasses to be readily formed with down-draw processes and shaped into complex shapes. In particular, the alkali aluminosilicate glass compositions described herein which contain $Ga_2O_3$ generally have softening temperatures, liquidus temperatures and CTEs which are lower than those glass compositions which do not contain $Ga_2O_3$ and, as such, these glasses are particularly suitable for use in down-draw processes and in applications which require the glass to be formed into complex 3-dimensional shapes. Moreover, the addition of $B_2O_3$ and/or fluorine to the glass compositions described herein also lowers the softening point of the glass thereby improving the ability to form the glass into complex 3-dimensional shapes.

The alkali aluminosilicate glasses described herein can be ion-exchange strengthened to achieve a high compressive stress without significantly compromising the depth of layer. In particular, additions of $P_2O_5$ generally increase the depth of layer which may be obtained by ion-exchange strengthening. Further, the alkali aluminosilicate glass compositions described herein can be much more rapidly ion exchanged to reach target depth of layer and compressive stress values compared to conventional alkali aluminosilicate glasses, thereby reducing processing time and costs.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass article formed from an alkali-containing glass, the alkali-containing glass comprising:
   about X mol % of $Ga_2O_3$, wherein X is from about 1 to about 20;
   about Z mol % of $Al_2O_3$, wherein $0 \leq Z \leq 25$ and $10 \leq (X+Z) \leq 25$;
   from about 5 mol % to about 35 mol % $Na_2O$;
   from about 40 mol % to about 70 mol % $SiO_2$;
   Y mol % of $B_2O_3$, where Y is from 0 to about 10; and
   (10-Y) mol % of $P_2O_5$.

2. The glass article of claim 1, wherein $17 \leq (X+Z) \leq 24$.

3. The glass article of claim 1, wherein when the alkali-containing glass includes a non-zero amount of $P_2O_5$, $$\frac{Y}{(10-Y)} < 1.6.$$

4. The glass article of claim 1, wherein $Y < 6.2$.

5. The glass article of claim 1, wherein a softening point of the alkali-containing glass is less than about 870° C.

6. The glass article of claim 1, wherein the glass article is ion-exchange strengthened such that the glass article has a compressive stress greater than about 625 MPa and a depth of layer greater than about 30 μm.

7. The glass article of claim 6, wherein the depth of layer is greater than about 45 μm.

8. The glass article of claim 6, wherein the compressive stress is greater than about 700 MPa.

9. The glass article of claim 1, wherein the alkali-containing glass has a liquid CTE<30 ppm/° C. at temperatures above a glass transition temperature of the alkali-containing glass.

10. The glass article of claim 1, wherein the glass article is ion-exchange strengthened such that the glass article has a compressive strength of greater than about 500 MPa and a depth of layer greater than about 10 μm.

11. A glass article formed from an alkali-containing glass, the alkali-containing glass comprising:
   about X mol % of $Ga_2O_3$, wherein X is from about 1 to about 20;
   about Z mol % of $Al_2O_3$, wherein $0 \leq Z \leq 25$ and $10 \leq (X+Z) \leq 25$;
   from about 5 mol % to about 35 mol % $Na_2O$;
   from about 40 mol % to about 70 mol % $SiO_2$;
   from about 1 mol % to about 10 mol % $B_2O_3$, wherein the alkali-containing glass has a softening point $\leq 875°$ C.

12. The glass article of claim 11, wherein $1 \leq X \leq 12$.

13. The glass article of claim 11, wherein $X \geq 4$ and $Z \geq 7$.

14. The glass article of claim 11, wherein the glass article comprises $\geq 4$ mol % $B_2O_3$.

15. The glass article of claim 11, wherein the alkali-containing glass comprises from about 50 mol % to about 65 mol % $SiO_2$.

16. The glass article of claim 11, wherein the alkali-containing glass comprises from about 15 mol % to about 25 mol % $Na_2O$.

17. The glass article of claim 11, wherein the softening point of the alkali-containing glass $\leq 850°$ C.

18. The glass article of claim 11, wherein $$\frac{Na_2O \ (mol. \ \%)}{(Al_2O_3 \ (mol. \ \%) + Ga_2O_3 \ (mol. \ \%))} \cong 1.$$

19. A glass article formed from an alkali-containing glass, the alkali-containing glass comprising:
   about X mol % of $Ga_2O_3$, wherein X is from about 1 to about 20;
   about Z mol % of $Al_2O_3$, wherein $0 \leq Z \leq 25$ and $10 \leq (X+Z) \leq 25$;
   from about 5 mol % to about 35 mol % $Na_2O$;
   from about 40 mol % to about 70 mol % $SiO_2$;
   from about 1 mol % to about 10 mol % $P_2O_5$, wherein the alkali-containing glass has a softening point $\leq 975°$ C.

20. The glass article of claim 19, wherein the glass article comprises $\geq 4$ mol % $P_2O_5$.

21. The glass article of claim 19, wherein $X \geq 2$ and $Z \geq 10$.

22. The glass article of claim 21, wherein $X \leq 10$ and $Z \leq 18$.

23. The glass article of claim 19, wherein the softening point of the alkali-containing glass is $\leq 900°$ C.

24. A glass article comprising an alkali aluminosilicate glass, the alkali aluminosilicate glass comprising:
   from about 10 mol % to about 20 mol % $Al_2O_3$;
   from about 40 mol % to about 70 mol % $SiO_2$;
   from about 10 mol % to about 20 mol % $Na_2O$;
   Y mol % $B_2O_3$, where Y is from 0-5;
   (5-Y) mol % $P_2O_5$; and
   from about 1 mol % to about 6 mol % fluorine.

25. The glass article of claim 24, wherein the glass article is ion-exchange strengthened such that the glass article has a compressive stress greater than about 1000 MPa and a depth of layer greater than about 40 μm.

26. The glass article of claim 24, wherein a softening point of the alkali aluminosilicate glass is less than about 930° C.

* * * * *